Jan. 12, 1965 E. W. KUEHL ETAL 3,165,340
QUICK COUPLING STRUCTURE
Filed Nov. 7, 1960 2 Sheets-Sheet 1

ERNEST W. KUEHL
IAN E. ROBB
INVENTORS

BY
Huebner & Worrel
ATTORNEYS.

Jan. 12, 1965     E. W. KUEHL ETAL     3,165,340
QUICK COUPLING STRUCTURE
Filed Nov. 7, 1960     2 Sheets-Sheet 2
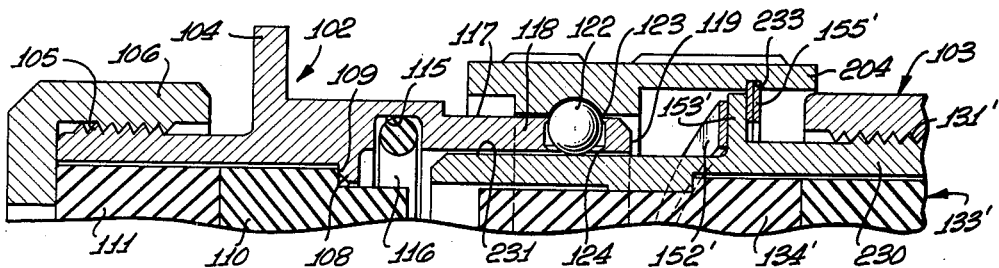
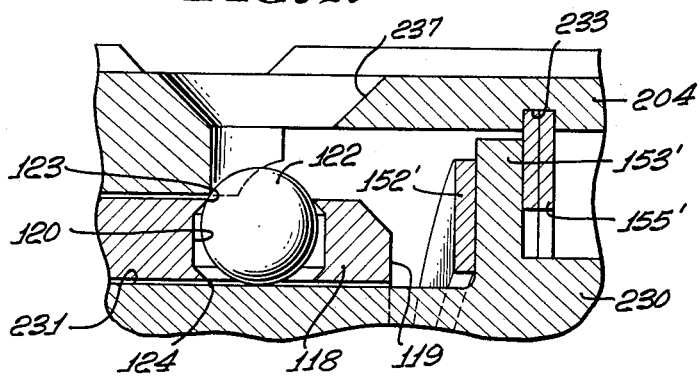
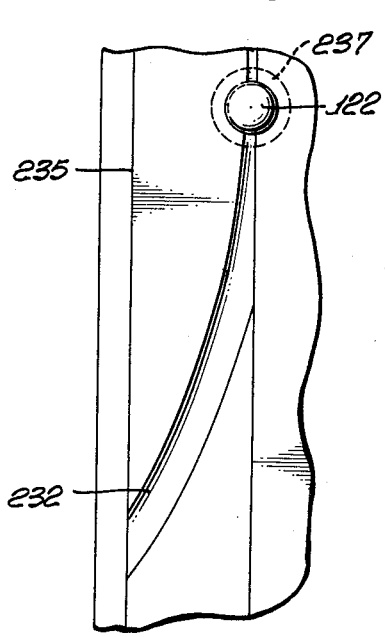
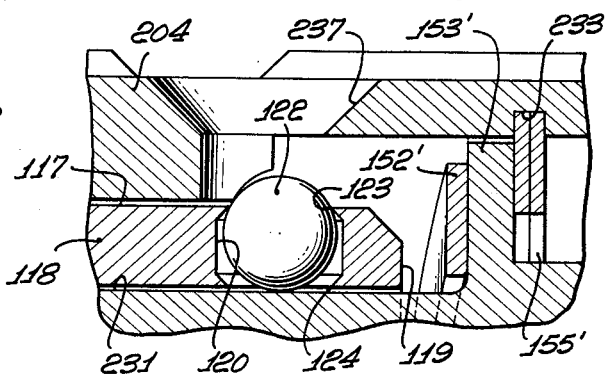
ERNEST W. KUEHL
IAN E. ROBB
INVENTORS.
BY Huebner & Worrel
ATTORNEYS.

United States Patent Office 3,165,340
Patented Jan. 12, 1965

3,165,340
QUICK COUPLING STRUCTURE
Ernest W. Kuehl, San Fernando, and Ian E. Robb, Newport Beach, Calif., assignors, by mesne assignments, to International Telephone and Telegraph Corporation, New York, N.Y., a corporation of Maryland
Filed Nov. 7, 1960, Ser. No. 67,805
10 Claims. (Cl. 285—316)

This application is a continuation-in-part of our co-pending application, Serial No. 747,406, filed July 9, 1958, and now abandoned.

This invention relates to a coupling for releasably securing a male member within a female member and is especially well suited for use in a multi-contact electrical connector for securing a plug of the connector in a connector receptacle.

It is a general object of this invention to provide an improved coupling structure for plug and receptacle members which is adapted to draw and lock the members together in the operation of inter-engaging the members by a partial rotation of a coupling collar rotatably mounted on the main tubular sleeve of the plug and adapted also to provide for quick release and disengagement of the members by a partial rotation of the coupling collar in a direction opposite to that for inter-engaging the members.

A further object of the invention is to provide a quick coupling device of the character described including a receptacle member embodying circumferentially positioned ball detents that are floatingly mounted for rotation and limited radial shifting, and a plug member having a rotatable outer sleeve engageable with the ball detents on the outside of the receptacle for coupling the members by partial rotation in one direction and adapted to uncouple the members by partial rotation in the opposite direction, the plug member also having an inner sleeve that enters the receptacle during coupling and which has an outer cylindrical surface that provides a shifting bearing surface for the ball detents during the coupling and uncoupling of the members.

Further objects and advantages of the invention will become apparent from a consideration of the subsequent detailed description, taken in conjunction with the drawings.

The form of the invention illustrated in the co-pending application provided a plug adapted for push-pull operation for coupling and uncoupling, although the receptacle thereof is fully adaptable to cooperative mating with a rotatable locking ring type of plug structure like that shown and described in the present application.

In the drawings:

FIG. 5 is a fragmentary view similar to FIG. 1 with receptacle and plug in a relationship intermediate between locked and unlocked position.

FIG. 6 is a fragmentary view somewhat similar to FIG. 3 with the locking ring partially rotated from the position seen in FIG. 3.

FIG. 7 is an enlarged fragmentary section with receptacle and plug interlocked.

FIG. 8 is a view similar to FIG. 7 with the receptacle and plug interlock broken ready for uncoupling.

Figure 1:
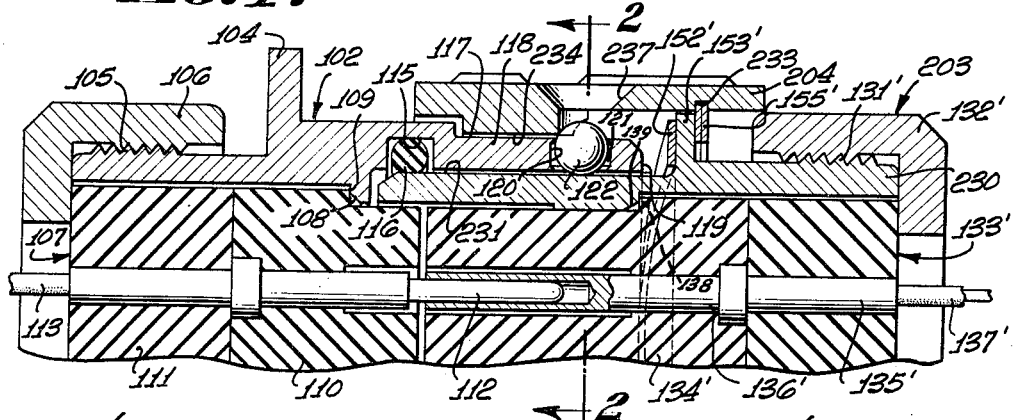
FIG. 1 is a vertical longitudinal section of an embodiment of this invention wherein the connector has a receptacle and plug fully coupled which employs a plug assembly in which a sleeve or locking ring on the plug is rotated to couple or uncouple.

Reference will now be made to the figures shown in the drawings where the assembly of the primary parts are shown as a receptacle designated 102 and a plug designated 203. These two primary parts are coupled by a partial rotation of an external sleeve or locking ring 204, relative to the receptacle 102.

The receptacle 102 is generally tubular in form, and is provided with an external circumferential flange 104 which may be either circular or straight edge (such as rectangular) in outline, and which optionally may incorporate holes for reception of screws or rivets or other mounting means, not illustrated, to mount the flange upon the wall of a cabinet, or upon an instrument panel, partition, or the like.

The rear end of the tubular receptacle member 102 is externally threaded at 105 to receive a threaded collar 106 which may be utilized to cooperate in the retention of an electrical connector assembly generally indicated at 107 in the receptacle 102.

The tubular receptacle member is also formed with an internal circumferential flange 108 which provides a shoulder as shown for abutment of a shoulder 109 on an insulation block 110. Rearwardly adjacent the insulation block 110 is another insulation block or grommet 111 which cooperates with the insulation block 110 in retaining electrical terminals such as contact pins 112 having electrical connection with conductors 113.

Forwardly of the internal flange 108 is an annular groove 115 wherein is disposed an O-ring 116 of resilient sealing characteristics.

The external diameter of the member 102 is reduced as seen at 117 and extends forwardly, providing a connecting sleeve section 118 terminating at its forward end in an annular plane extremity 119. Formed in the sleeve section 118 adjacent the end 119 are one or more ball-retaining sockets 120. As noted by reference to FIG. 2, there are illustrated three such sockets, although a different number will operate. Each socket 120 comprises a cylindrical bore 121 with its axis shown as radial to the axis of the receptacle member, and the bore 121 has a diameter large enough to loosely accommodate a detent shown in the form of a steel ball 122 which may shift in a radial direction outwardly and inwardly in the bore, being permanently confined therein by annular constricting lips 123 and 124 at the external and internal surfaces of the sleeve section 118. The diameter of the lips 123 and 124 is slightly less than the diameter of the ball 122 so that while the ball cannot escape through the lips in either direction, it can shift so that a substantial chordal segment of the sphere may under certain conditions protrude inwardly or outwardly from the respective inner and outer walls of the sleeve section 118. These balls 122 function as locking members for preventing axial separation of the receptacle and plug when suitably positioned for the purpose as will hereinafter more fully appear.

The plug 203 comprises a primary tubular member 230 which is formed with a smooth annular external surface 231 extending from its flange 153' to its forward beveled end. This unrelieved external surface forces the balls 122 outwardly whenever the plug is inserted into the receptacle. In such relationship the balls remain outwardly at all times, and the locking is accomplished by engagement of the balls in internal grooves 232 in the locking ring or collar 204. Furthermore, the tubular member 230 of plug 203 is formed with an externally threaded rearward section 131' to which is threadably secured a collar 132' which cooperates in securing a connector assembly 133' in the sleeve or tube. This assembly includes an insulation block 134' forward of a second insulation block or grommet 135', the two insulation members serving to supportably mount socket terminals 136' electrically connected with conductors 137'. The forward insulation 134' is formed with a shoulder 138 which abuts against a flange 139 provided on the internal surface of the tubular member 230.

Figure 2:
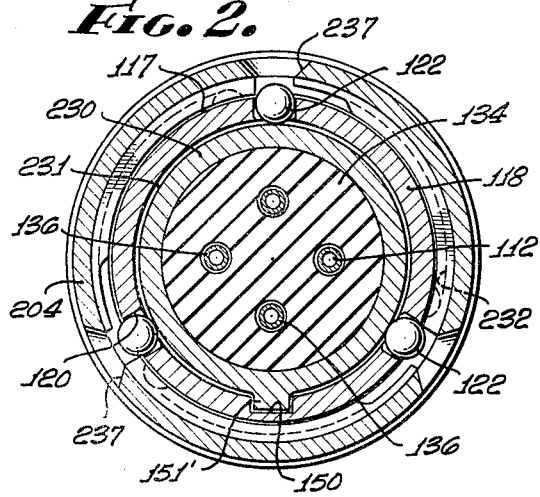
FIG. 2 is a cross-section taken on line 2—2 of FIG. 1.
Figure 4:
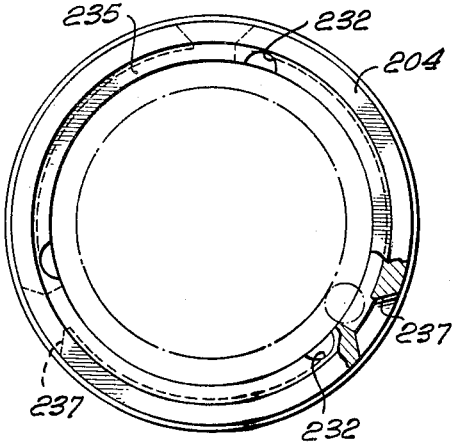
FIG. 4 is an end view of the locking ring as seen at 4—4 in FIG. 3.
Figure 3:
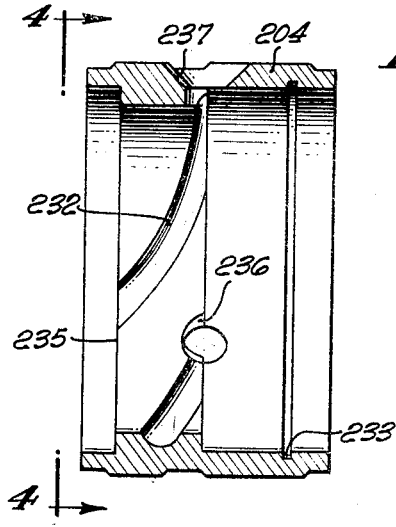
FIG. 3 is a vertical section of the sleeve or locking ring of FIGS. 1–2.

The socket contact terminals 136' of the plug physically and electrically engage with the pin contact terminals 112 of the receptacle. The contacts, of course, could be reversed without departing from the spirit of the invention. Moreover, the couplings disclosed are adapted to housing various types and designs of electrical connectors, the one illustrated being by way of an example only, and not by way of limitation. It should be noted that polarizing and inhibiting of relative rotation between the receptacle and plug is provided by a key 151' on the plug and a key-way 150 in the receptacle, as seen in FIG. 2. The locking ring 204, however, is mounted for rotary axial movement on the tubular member 230.

This locking ring or collar 204 is generally annular in design and embodies an annular groove 233 for reception of a split ring 155'. This ring 155' is adapted to abut against the rear face of flange 153' to limit forward movement of the locking ring 204 and the same ring 155' may abut against a forward face of a cap member 132' which is threaded on the rear end of the tubular member 230, to limit rearward axial movement of the locking ring 204.

This locking ring further embodies a reduced diameter internal rotational bearing surface 234 which is journaled on the external surface 117 of the receptacle when the receptacle and plug are coupled together. An annular marcel spring 152' is interposed between the forward face of the flange 153' and the forward end 119 of the receptacle to yieldably urge the receptacle and plug apart for the purpose of snapping the balls into sockets as will appear.

If three balls or detents are employed in the receptacle, three corresponding fragmentary helical grooves 232 are provided in the locking ring. Each of these grooves is open at the forward end 235 of the ring so that upon the proper rotative positioning of the ring it may be advanced upon the surface 117 of the receptacle by relative rotation therewith. Each of the grooves 232 is formed at its inner end with an axially offset socket 236 of a size to snugly receive one of the balls. These socket 236 are displaced slightly forwardly of the inside terminal end of the grooves and are in open communication with tapered inspection holes 237.

In use, when the plug is inserted into the receptacle, the balls 122 (or equivalent detents) are pushed outwardly by action of the cylindrical surface 231 of the plug tubular member 230 in which position the balls are in condition for cooperative engagement with the grooves 232 of the locking ring 204. The ring 204 is manually rotated relative to the receptacle and thereby becomes shifted longitudinally toward the receptacle, the receptacle and plug have become inter-engaged by the agency of the balls against axial separation but not yet interlocked. The interlocking occurs by a snap action when the fractional rotation of the locking ring 204 is completed to the point where the sockets 236 are positioned to receive the balls, whereupon the action of the marcel spring 152' causes an axial snap movement of the locking ring and the balls become lodged in the sockets with sufficient displacement from the normal path of the grooves that the locking ring is held against unintended reverse rotation, and the plug and receptacle remain coupled.

For uncoupling, a reverse rotation of the sleeve 204 by manual action with a force sufficient to dislodge the balls from the sockets, will enable a completion of the reverse or left hand twist or rotation of the locking ring to be completed to the point where the open ends of the grooves pass by the balls, and when that occurs the receptacle and plug are disconnected for complete separation.

While the instant invention has been shown and described herein in what is conceived to be the most practical and preferred embodiment it is recognized that departures may be made therefrom within the scope of the invention, which is therefore not to be limited to the details disclosed herein but is to be accorded the full scope of the claims so as to embrace any and all equivalent devices.

What we claim as our invention is:

1. A quick coupling and uncoupling device comprising a receptacle member including a single forwardly extending tubular sleeve, a plug member including a forwardly extending internal sleeve adapted to axially enter said receptacle sleeve in coupling relationship, said receptacle sleeve having a radial opening extending therethrough, a ball locking detent floatingly mounted in said radial opening and captive therein, the diameter of the ball detent being greater than the wall thickness of said receptacle sleeve, an external sleeve rotatably mounted on the plug member and engageable over said receptacle sleeve, said external plug sleeve having an internally disposed shoulder facing rearwardly of the plug and the internal plug sleeve having an external bearing surface of right-circular cylindrical configuration, said external sleeve being quickly rotatable between a lock position in which said bearing surface holds said detent against said shoulder to lock the receptacle and plug against relative axial movement and a release position in which the detent is freed from said shoulder to permit axial separation of the plug and receptacle, said shoulder having a spiral portion and said external sleeve being rotatable in one direction on the plug member to cause said spiral portion of the shoulder to engage said detent and draw the members together into their final coupling relationship, said sleeve being rotatable in the opposite direction to free the detent from said shoulder and permit axial separation of the members.

2. A quick coupling and uncoupling device as defined in claim 1, wherein said spiral portion of the shoulder terminates at an innermost end adjacent a forwardly offset shoulder portion engageable with said detent.

3. A quick coupling and uncoupling device as defined in claim 2 which includes spring means mounted on said plug member and engageable against said receptacle sleeve so as to bias the plug member and receptacle sleeve axially apart when the plug and receptacle are fully coupled, so as to provide biased engagement of the detent in said forwardly offset shoulder portion.

4. A quick coupling and uncoupling device as defined in claim 1, wherein said shoulder has a spiral portion which embodies a slope that is continuously variable relative to the axis of the plug.

5. A quick coupling and uncoupling device as defined in claim 1, wherein said shoulder has a spiral portion which embodies a slope that is infinitely variable relative to the axis of the plug, the slope being relatively steep proximate the forwardmost end of the shoulder and relatively shallow proximate the rearwardmost end of the shoulder.

6. A quick coupling and uncoupling device comprising a receptacle member including a single forwardly extending tubular sleeve, a plug member including a forwardly extending internal sleeve adapted to axially enter said receptacle sleeve in coupling relationship, said receptacle sleeve having a radial opening extending therethrough, a ball locking detent floatingly mounted in said radial opening and captive therein, the diameter of the ball detent being greater than the wall thickness of said receptacle sleeve, an external sleeve rotatably mounted on the plug member and engageable over said receptacle sleeve, said external plug sleeve having an internally disposed groove and the internal plug sleeve having an external bearing surface of right-circular cylindrical configuration, said external sleeve being quickly rotatable between a lock position in which said bearing surface holds said detent in said groove to lock the receptacle and plug against relative axial movement and a release position in which the detent is freed from said groove to permit axial separation of the plug and receptacle, said groove having a spiral portion and said external sleeve being rotatable in one direction on the plug member to cause said spiral portion of the groove to engage said detent and draw the members together into their final coupling relationship, said sleeve being rotatable in the opposite direction to free the detent from said groove and permit axial separation of the members.

7. A quick coupling and uncoupling device as defined in claim 6, wherein said spiral portion of the groove terminates at an innermost end adjacent a forwardly offset opening adapted to receive said detent.

8. A quick coupling and uncoupling device as defined in claim 7 which includes spring means mounted on said plug member and engageable against said receptacle sleeve so as to bias the plug member and receptacle sleeve axially apart when the plug and receptacle are fully coupled, so as to provide biased engagement of the detent in said forwardly offset opening.

9. A quick coupling and uncoupling device as defined in claim 6, wherein said groove has a spiral portion which embodies a slope that is continuously variable relative to the axis of the plug.

10. A quick coupling and uncoupling device as defined in claim 6, wherein said groove has a spiral portion which embodies a slope that is infinitely variable relative to the axis of the plug, the slope being relatively steep proximate the forwardmost end of the shoulder and relatively shallow proximate the rearwardmost end of the shoulder.

References Cited by the Examiner
UNITED STATES PATENTS

| | | | |
|---|---|---|---|
| 2,409,650 | 10/46 | Wiggins | 339—91 X |
| 2,705,159 | 3/55 | Pfau | 285—315 X |
| 2,727,759 | 12/55 | Elliott | 285—316 X |
| 2,735,993 | 2/56 | Humphrey | 339—91 |
| 2,892,991 | 6/59 | Beebee et al. | 339—91 |
| 2,933,712 | 4/60 | Kfopfenstein | 339—94 X |
| 2,984,811 | 5/61 | Hennessey et al. | 339—90 X |

FOREIGN PATENTS 484,768   5/38   Great Britain.

JOSEPH D. SEERS, *Primary Examiner.*